(12) United States Patent
Hulseman et al.

(10) Patent No.: US 10,687,642 B2
(45) Date of Patent: Jun. 23, 2020

(54) MICROSTRUCTURED PACKAGING SURFACES FOR ENHANCED GRIP

(71) Applicant: HAVI Global Solutions, LLC, Downers Grove, IL (US)

(72) Inventors: Ralph Allen Hulseman, Greenville, SC (US); Cameron McPherson, Central, SC (US)

(73) Assignee: HAVI Global Solutions, LLC, Downers Grove, IL (US)

(*) Notice: Subject to any disclaimer, the term of this patent is extended or adjusted under 35 U.S.C. 154(b) by 223 days.

(21) Appl. No.: 15/631,892

(22) Filed: Jun. 23, 2017

(65) Prior Publication Data

US 2018/0000266 A1 Jan. 4, 2018

Related U.S. Application Data

(63) Continuation-in-part of application No. 15/424,627, filed on Feb. 3, 2017, now Pat. No. 9,988,201.
(Continued)

(51) Int. Cl.
*A47G 19/22* (2006.01)
*B32B 3/30* (2006.01)
(Continued)

(52) U.S. Cl.
CPC ......... *A47G 19/2288* (2013.01); *A47G 19/22* (2013.01); *B32B 3/30* (2013.01);
(Continued)

(58) Field of Classification Search
CPC . Y10T 428/24479; Y10T 428/28; G09F 3/02; G09F 3/10; B32B 3/30
(Continued)

(56) References Cited

U.S. PATENT DOCUMENTS 2,778,173 A 1/1957 Taunton et al.
4,756,422 A 7/1988 Kristen
(Continued)

FOREIGN PATENT DOCUMENTS

DE 102008048298 A1 5/2010
EP 932136 A1 7/1999
(Continued)

OTHER PUBLICATIONS 3M, 3M Griping Material, Brochure, 2011 pp. 1-8, 3M, USA.
(Continued)

*Primary Examiner* — Catherine A. Simone
(74) *Attorney, Agent, or Firm* — Neal, Gerber & Eisenberg LLP; Kevin A. O'Connor; Daniel Organ

(57) ABSTRACT

A label with improved physical properties comprising: a base layer having a microstructured area; a composite microstructure having a first, second and third set of microstructures disposed on the microstructured area; a dry lift force attributable to the composite microstructure greater than 7 pounds according to lift testing; a wet lift force attributable to the composite microstructure greater than 7 pounds according to lift testing; an adhesive layer affixed to the base layer for affixing the label to a container; and, thereby providing a microstructured label having improved gripping physical properties that can be affixed to a container.

22 Claims, 11 Drawing Sheets

Related U.S. Application Data

(60) Provisional application No. 62/355,081, filed on Jun. 27, 2016, provisional application No. 62/291,833, filed on Feb. 5, 2016.

(51) Int. Cl.
  *B65D 65/42* (2006.01)
  *B65D 81/38* (2006.01)
  *B65D 23/08* (2006.01)
  *B65D 23/10* (2006.01)
  *B65D 25/28* (2006.01)
  *B65D 25/36* (2006.01)

(52) U.S. Cl.
  CPC ......... *B65D 23/085* (2013.01); *B65D 23/104* (2013.01); *B65D 25/2802* (2013.01); *B65D 25/36* (2013.01); *B65D 65/42* (2013.01); *B65D 81/3811* (2013.01); *B65D 81/3874* (2013.01)

(58) Field of Classification Search
  USPC .................................................. 428/156, 40.1
  See application file for complete search history.

(56) References Cited

U.S. PATENT DOCUMENTS

| | | |
|---|---|---|
| 5,044,642 A | 9/1991 | Vogt et al. |
| 5,182,069 A | 1/1993 | Wick et al. |
| 5,728,086 A | 3/1998 | Niedospial, Jr. et al. |
| 5,738,671 A | 4/1998 | Niedospial, Jr. et al. |
| 5,857,275 A | 1/1999 | Deal |
| 6,331,334 B1 | 12/2001 | Trepte et al. |
| 6,420,622 B1 | 7/2002 | Johnston et al. |
| 6,431,695 B1 | 8/2002 | Johnston et al. |
| 6,534,166 B1 | 3/2003 | Pip et al. |
| 6,540,949 B2 | 4/2003 | Pip et al. |
| 6,741,523 B1 | 5/2004 | Bommarito et al. |
| 6,800,234 B2 | 10/2004 | Ferguson et al. |
| 6,803,090 B2 | 10/2004 | Castiglione et al. |
| 6,872,438 B1 | 3/2005 | Allgeuer et al. |
| 6,946,182 B1 | 9/2005 | Allgeuer et al. |
| 6,984,278 B2 | 1/2006 | Anderson et al. |
| 7,137,803 B2 | 11/2006 | Chou |
| 7,185,453 B2 | 3/2007 | Spear et al. |
| 7,534,039 B2 | 5/2009 | Wu |
| 7,608,160 B2 | 10/2009 | Zhou et al. |
| 7,703,179 B2 | 4/2010 | Ferguson et al. |
| 8,124,216 B2 * | 2/2012 | Antonini .................. B32B 3/00 428/172 |
| 8,153,226 B2 | 4/2012 | Curro et al. |
| 8,318,284 B2 | 11/2012 | Curro et al. |
| 8,431,206 B2 | 4/2013 | Kim |
| 8,440,286 B2 | 5/2013 | Curro et al. |
| 8,448,530 B2 | 5/2013 | Leuenberger et al. |
| 8,460,568 B2 | 6/2013 | David et al. |
| 8,486,319 B2 | 7/2013 | Victor et al. |
| 8,590,193 B2 | 11/2013 | Licha |
| 8,720,047 B2 | 5/2014 | Hulseman et al. |
| 8,784,713 B2 | 7/2014 | Victor et al. |
| 8,814,954 B2 | 8/2014 | Hulseman et al. |
| 8,900,651 B2 | 12/2014 | McClain et al. |
| 8,926,782 B2 | 1/2015 | Zhou et al. |
| 9,119,450 B2 | 9/2015 | Lee et al. |
| 9,120,670 B2 | 9/2015 | Hulseman et al. |
| 9,238,309 B2 | 1/2016 | King et al. |
| 9,303,322 B2 | 4/2016 | Victor et al. |
| 9,517,122 B2 | 12/2016 | Firstenberg et al. |
| 9,526,640 B2 | 12/2016 | Bertolino et al. |
| 9,857,000 B2 | 1/2018 | Agarwal et al. |
| 2001/0007682 A1 | 7/2001 | Chiu et al. |
| 2002/0114920 A1 | 8/2002 | Scholz et al. |
| 2003/0006535 A1 | 1/2003 | Hennessey et al. |
| 2004/0050948 A1 | 3/2004 | Bartels |
| 2005/0189314 A1 | 9/2005 | Carbone |
| 2006/0005362 A1 | 1/2006 | Arzt et al. |
| 2006/0121248 A1 | 6/2006 | Lorenz et al. |
| 2006/0214380 A1 | 9/2006 | Dietle et al. |
| 2007/0025648 A1 | 2/2007 | Micnerski et al. |
| 2007/0241515 A1 | 10/2007 | Sato et al. |
| 2008/0199110 A1 | 8/2008 | Anderson et al. |
| 2009/0065141 A1 | 3/2009 | Kerber |
| 2009/0082856 A1 | 3/2009 | Flanagan |
| 2009/0121383 A1 | 5/2009 | Jagota et al. |
| 2009/0146336 A1 | 6/2009 | Masi |
| 2009/0184175 A1 | 7/2009 | Blankenstein et al. |
| 2009/0233041 A1 | 9/2009 | Rasmussen |
| 2010/0096408 A1 | 4/2010 | Schiewe et al. |
| 2010/0129608 A1 | 5/2010 | Low et al. |
| 2010/0308497 A1 | 12/2010 | David |
| 2010/0320111 A1 | 12/2010 | Maier |
| 2011/0266724 A1 | 11/2011 | Hulseman et al. |
| 2011/0282284 A1 | 11/2011 | Kriesel et al. |
| 2011/0311764 A1 | 12/2011 | Hulseman et al. |
| 2012/0009387 A1 | 1/2012 | Wang et al. |
| 2012/0052241 A1 | 3/2012 | King et al. |
| 2012/0126458 A1 | 5/2012 | King et al. |
| 2012/0136304 A1 | 5/2012 | Wyss et al. |
| 2013/0101791 A1 | 4/2013 | Hitschmann et al. |
| 2013/0216712 A1 | 8/2013 | Merz |
| 2014/0147629 A1 | 5/2014 | Tanaka et al. |
| 2014/0200679 A1 | 7/2014 | Bluecher et al. |
| 2014/0270599 A1 | 9/2014 | Farhat et al. |
| 2014/0276494 A1 | 9/2014 | Cisko et al. |
| 2014/0318657 A1 | 10/2014 | Bixler et al. |
| 2014/0343687 A1 | 11/2014 | Jennissen |
| 2015/0122846 A1 | 5/2015 | Stanley et al. |
| 2015/0140309 A1 | 5/2015 | Pricone |
| 2015/0175329 A1 | 6/2015 | Wilke et al. |
| 2015/0209846 A1 | 7/2015 | Aizanberg et al. |
| 2015/0298378 A1 | 10/2015 | Hulseman et al. |
| 2015/0298379 A1 | 10/2015 | Hulseman et al. |
| 2015/0307773 A1 | 10/2015 | Hulseman et al. |
| 2015/0327645 A1 | 11/2015 | Lee et al. |
| 2015/0328815 A1 | 11/2015 | Hulseman et al. |
| 2015/0368838 A1 | 12/2015 | Hulseman et al. |
| 2016/0052177 A1 | 2/2016 | Chauvin et al. |
| 2017/0014111 A1 | 1/2017 | Hulseman et al. |
| 2017/0095019 A1 | 4/2017 | Milbocker et al. |

FOREIGN PATENT DOCUMENTS

| | | | |
|---|---|---|---|
| WO | WO-2011156670 A1 * | 12/2011 | ............... B22F 3/17 |
| WO | 2014152477 A1 | 9/2014 | |
| WO | 2014154659 A1 | 10/2014 | |
| WO | 2015057053 A1 | 4/2015 | |
| WO | 2015069857 A1 | 5/2015 | |
| WO | WO 2018/005294 A1 | 1/2018 | |

OTHER PUBLICATIONS

Gravish et al., Frictional and Elastic Energy in Gecko Adhesive Detachment, Journal of the Royal Society Interface, 2007, pp. 1-10, FirstCite e-publishing.
Barquins, Sliding Friction of Rubber and Schallamach Waves—A Review, Materials Science and Engineering, 1985, 45-63, vol. 73.
Bico et al. Rough Wetting, IOP Science, Journal article, Jul. 15, 2001, pp. 214-220, vol. 55, Europhysics Letters.
Autumn et al., Evidence for Van Der Waals Adhesion in Gecko Setae, PNAS, Sep. 17, 2002, 12252-12256, vol. 99, USA.
Metin Sitti et al., Syntehtic Gecko Foot-Hair Micro/Nano-Structures as Dry Adhesives, J. Adhesion Sci. Technol., vol. 17, No. 8, pp. 1055-1073 (2003).
Majidi et al., Attachment of Fiber Array Adhesive Through Side Contact, Journal of Applied Physics, 2005, pp. 103521-103521-5, vol. 98, California.
Majidi et al., High Friction from a Stiff Polymer Using Microfiber Arrays, Physical Review Letters Aug. 18, 2006, pp. 076103-076103-4 vol. 97, USA.
Kustandi et al., Fabrication of a Gecko-like Hierarchical Fibril Array Using a Bonded Porous Alumina Template, Journal of

(56) References Cited

OTHER PUBLICATIONS

Micromechanics and Microengineering, Sep. 5, 2007, pp. N75-N81, vol. 1 IOP Publishing.
Lee et al., Directional Adhesion of Gecko-Inspired Angled Microfiber Arrays, Applied Physics Letters, Nov. 13, 2008, pp. 191910-1-191910-3, vol. 93, American Institute of Physics, USA.
Autumn, Gecko Adhesion: Structure, Function, and Applications, MRS Bulletin, Jun. 2007, pp. 473-478, vol. 32.
Murphy et al., Gecko-Inspired Directional and Controllable Adhesion, Small, 2009, pp. 170-175, No. 5, Wiley-VCH Verlag GmbH & Co. KGaA, Weinheim.
Autumn et al., Gecko Adhesion: Evolutionary Nanotechnology, Phil. Trans. R. Soc. A, Jan. 11, 2008, pp. 1575-1590, Vol. The Royal Society.
Mahdavi et al., A Biodegradable and Biocompatible Gecko-Inspired Tissue Adhesive, PNAS, Feb. 19, 2008, pp. 2307-2312, vol. 105 No. 7.
Forsberg et al., Contact Line Pinning on Microstructured Surfaces for Liquids in the Wnezel State, Langmuir Article, 2010, pp. 860-865, 26(2), American Chemical Society.
Ben-David et al., The Dynamics of the Onset of Frictional Slip, Science Mag., Oct. 8, 2010, pp. 1-7, vol. 330, AAAS.
Ben-David et al., The Dynamics of the Onset of Frictional Slip, Science Mag., Oct. 8, 2010, pp. 210-214, vol. 330, AAAS.
Zappwei et al., Looking at How Things Slip, Science Mag., Oct. 8, 2010, pp. 184-185, vol. 330, AAAS.
Y.M Park et al., Artificial Petal Surface Based on Hierarchical Micro- and Nanostructures, Thin Solid Films, Jul. 18, 2011, pp. 362-367, vol. 520, Elsevier B.V. South Korea.
Labonte et al., Surface Contact and Design of Fibrillar 'Friction Pad' in stick insects (*Carausius morosus*): Mechanisms for large Friction Coefficients and Negligible Adhesion, J. R. Soc. Interface, Jan. 27, 2014, pp. 1-13, vol. 11.
Tsipenyuk et al., Use of Biomimetic Hexagonal Surface Texture in Friction Against Lubricated Skin, J. R. Soc. Interface, Feb. 18, 2014, pp. 1-6, vol. 11.
Tian et al., Adhesion and Friction in Gecko Toe Attachment and Detachment, PNAS, Dec. 19, 2006, pp. 19320-1932, vol. 103 No. 51.
Barquins, Friction and Wear of Rubber-Like Materials, 1993, pp. 1-11, Elsevier Sequoia, France.
Ebert et al., Wear-Resistant Rose Petal Effect Surfaces with Superhydrophobicity and High Droplet Adhesion Using Hydrophobic and Hydrophilic Nanoparticles, Journal of Colloid and Interface Science, Jul. 4, 2012, pp. 182-188, USA.
Chen et al., Bio-Mimetic Mechanisms of Natural Hierarchical Materials: A Review, Journal of the Mechanical Behavior of Biomedical Materials, Nov. 17, 2012, pp. 3-33, vol. 19, Elsevier Ltd.
Liu et al., Bio-Inspired Superoleophobic and Smart Materials: Design, Fabrication, and Application, Progress in Materials Science, Nov. 15, 2012, pp. 503-564, vol. 58, Elsevier Ltd.
Lee et al., Directional Adhesion of Gecko-Inspired Angled Microfiber Arrays. Applied Physics letters, Nov. 13, 2008, pp. 191910-1-191910-3, vol. 93, American Institute of Physics.
Schubert et al., Towards Friction and Adhesion From High Modulus Microfiber Arrays, J. Adhesion Sci. Technol., Aug. 8, 2007, pp. 1297-1315, vol. 21 No. 12-13. VSP.
Cannon et al., Extrusion of Low Friction and Low Tack Microstructured Surfaces on Silicone Rubber, Oct. 9-11, 2012, pp. 1-10.
Autumn et al., Effective Elasstic Modulus of Isolated Gecko Setal Arrays, The Journal of Experimental Biology, Jun. 5, 2006 pp. 3558-3568, vol. 209, The Company of Biologists.
Autumn et al., Frictional Adhesion: A New Angle on Gecko Attachment, The Journal of Experimental Biology, Aug. 11, 2006, pp. 3569-3579, vol. 209, The Company of Biologists.
Zhao et al., Adhesion and Friction Force Coupling of Gecko Setal Arrays: Implications for Structured Adhesive Surfaces, Langmuir, 2008, pp. 1517-1524, vol. 24, The American Chemical Society.
Liu et al., Bio-Inspired Design of Multiscale Structures for Funtion Integration, Nano Today, Mar. 5, 2011, pp. 155-175, vol. 6, Elsevier Ltd.
Autumn et al., Adhesive Force of a Single Gecko Foot-hair, Nature, Jun. 8, 2000, pp. 681-685, vol. 405, Macmillan Magazines Ltd.
Machalek, Porcupine Quills, Gecko Feet and Spider Webs Inspire Medical Materials, National Institute of General Medical Sciences, Mar. 6, 2013, pp. 1-2.
Schallamach, How Does Rubber Slide?, Wear, Dec. 12, 1970, pp. 301-312, vol. 17, Elsevier Sequoia.
Qu et al., Carbon Nanotube Arryas with Strong Shear Binding-On and Easy Normal Lifting-Off, Science Mag., Oct. 10, 2008, pp. 238-242, vol. 322, AAAS.
Liu et al., A New Generation High-Drag Proppant: Prototype Development, Laboratory Testing, and Hydraulic Fracturing Modeling, SPE International, Feb. 2015, pp. 1-5, Society of Petroleum Engineers.
39. Pugno, Spiderman Gloves, Nano Today, Oct. 2008, pp. 35-41, vol. 3, Elsevier Ltd.
Ramesh et al., Friction Characteristics of Microtextured Surfaces Under Mixed and Hydrodynamic Lubrication, Tribology International, Aug. 7, 2012, pp. 170-176, vol. 57, Elsevier Ltd.
Villacorta et al., Viscoelastic Computational Modeling of Extruded Micro-Textured Polymeric Films, Procedia Materials Science, 2014, pp. 1460-1465, vol. 5, Elsevier Ltd.
U.S. Appl. No. 62/291,833.
U.S. Appl. No. 62/319,563.
U.S. Appl. No. 62/355,081.
U.S. Appl. No. 62/372,896.
International Search Report & Written Opinion dated Apr. 13, 2017 for PCT Application No. PCT/US2017/016579 (8 pages).
International Search Report & Written Opinion dated Aug. 7, 2017 for PCT Application No. PCT/US17/26435 (12 pages).
International Search Report & Written Opinion dated Aug. 28, 2017 for PCT Application No. PCT/US2017/0390085 (11 pages).
The International Bureau of WIPO, International Preliminary Report on Patentability in International Application No. PCT/US2017/039085 (dated Jan. 1, 2019).
The United States Patent and Trademark Office, International Search Report in International Application No. PCT/US2017/039085 (dated Aug. 28, 2017).
The United States Patent and Trademark Office, Written Opinion in International Application No. PCT/US2017/039085 (dated Aug. 28, 2017).

* cited by examiner

MICROSTRUCTURED PACKAGING SURFACES FOR ENHANCED GRIP

CROSS REFERENCE

This application claims priority from U.S. provisional patent application 62/355,081 filed on Jun. 27, 2016. This application is also a Continuation-in-Part of U.S. application Ser. No. 15/424,627 filed on Feb. 3, 2017 which, in turn, claims priority on U.S. provisional patent application 62/291,833 filed on Feb. 5, 2016, all of which are incorporated by reference.

BACKGROUND OF THE INVENTION

1) Field of the Invention

The present invention relates to labels, surfaces, and other features that can be affixed to, attached to, or integrated into an article including cups, bottles, closures, cans, bowls, trays, containers, boxes, hang tags, and other objects that may come into contact with a person's hand or finger. The label, surface, or other feature may enable a person to have an improved grip of the article.

2) Description of Related Art

Articles, containers, and other objects such as those listed above may contain a liquid that is cool, causing the surface to have a temperature below the dew point, enabling water to form on the outer surface. When the surface has such condensation, it can become slick making the object more difficult to hold. Further, containers with fluids such as detergents, shampoos, sun tan lotions, and similar items may include the contents on the outside surface of the container creating a slick surface. This may decrease the gripping ability of a user.

Some containers may include different container orientations, indentations, and the like to increase the gripping ability of a user. Other containers may include coatings or adhesives, which may increase a coefficient of friction between the container and the hand of a user.

SUMMARY OF THE INVENTION

Accordingly, it is an object of the present invention to provide a label, object, or other contact surface that provides improved friction and grip properties, such as reduced grip strength requirements and improved friction between a label, object, or contact surface and a hand.

It is another object of the present invention to provide microstructures that are invisible or near invisible to the naked eye while providing the improved physical properties. These microstructures may provide improved qualities without affecting the aesthetic of a given label, object, or contact surface.

Some objects of the present disclosure may include providing a label that enables a user to more securely grip an object, and reduce the risk of slippage, especially where the object has condensation or another liquid on the outer surface. The above objectives may be accomplished according to the present disclosure by providing a label, object, or contact surface with improved physical properties comprising: a base layer having a microstructured area; a composite microstructure disposed on the microstructured area comprising a first set of microstructures having a first micro-feature with a first diameter (or width) between 80 μm and 120 μm, a second set of microstructures having a second micro-feature with a second diameter (or width) between 25% and 41% of the first diameter, and a third set of microstructures having a third micro-feature with a third diameter (or width) between 3% and 6% of the first diameter; and an adhesive layer affixed to the base layer configured to affix the base layer to the object. For purposes of the present invention, the adhesive layer may comprise traditional adhesives such as glues. However, those of ordinary skill in the art will understand that the adhesive layer may also comprise any other material suitable for affixing the base layer to an object without depart from the novel scope of the present invention.

In one example, a contact surface for an object may comprise a base layer having a microstructured area, a composite microstructure disposed on the microstructured area comprising: a first set of microstructures disposed on the base layer; a second set of microstructures having a first portion disposed on the base layer and a second portion disposed on the first set of microstructures; and a third set of microstructures having a first portion disposed on the base layer, a second portion disposed on the first set of microstructures, and a third portion disposed on the second set of microstructures, and an adhesive layer affixed to the base layer configured to affix the base layer to the object.

In a further example, a contact surface for an object may include a set of microstructures, disposed on a surface, comprising a first micro-feature having a diameter in the range of 15 μm to 3000 μm, a depth in the range of 30 μm and 1500 μm and pitch in the range of 100 μm and 3000 μm, and a second micro-feature having a diameter between 25% and 41% smaller than the first micro-feature diameter, wherein a contact percentage attributable to the set of microstructures between the set of microstructures and skin of a person gripping the surface is in the range of 1% to 25%.

The invention can include where the first set of microfeatures have deformed edges so that a set of first microfeatures forms peaks and valleys on the base layer. The composite microstructure can have a height in the range of 30 μm to 100 μm and a contact percentage of the composite microstructure to the skin is in the range of 1% to 7%. The set of first microstructures can have a cross section taken from the group consisting of circular, square, oval, triangle, rectangle, bar or any combination thereof. The base layer and adhesive layer can be semi-transparent or transparent.

The first set of microstructures can have a pitch in the range of 260 μm to 300 μm, the second set of microstructures can have a pitch less than 24% the pitch of the first set of micro-features and the third set of microstructures can have a pitch less than 15% the pitch of the first set of micro-features. The first, second, and third set of microstructures can be registered or unregistered.

The invention can include a label, object, or contact surface with improved physical properties comprising: a base layer having a microstructured area; a set of microstructures disposed on the microstructured area having a micro-feature with a diameter in the range of 15 μm to 3000 μm, a depth in the range of 30 μm and 1500 μm and pitch in the range of 100 μm and 3000 μm; a dry lift force attributable to the set of microstructures greater than 7 pounds according to lift testing; a wet lift force attributable to the set of microstructures greater than 8 pounds according to lift testing; a contact percentage attributable to the set of microstructures between the set of microstructures and the skin in the range of 0.5% to 30%; and, thereby providing a microstructured label having improved gripping physical properties that can be affixed to a container.

The invention can include a label, object, or contact surface with improved physical properties comprising: a set of microstructures disposed on a surface having a micro-feature having a diameter in the range of 15 μm to 3000 μm, a depth in the range of 30 μm and 1500 μm and pitch in the range of 100 μm and 3000 μm; a dry lift force attributable to the set of microstructures greater than 7 pounds according to lift testing; a wet lift force attributable to the set of microstructures greater than 8 pounds according to lift testing; a contact percentage attributable to the set of microstructures between the set of microstructures and the skin in the range of 0.5% to 30%; and, thereby providing a microstructured label having improved gripping physical properties that can be affixed to a container. The surface can be an outer surface of a container or a base layer.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this disclosure. These and other objects and features of the disclosure will become more fully apparent when the following detailed description is read in conjunction with the accompanying figures and examples. However, it is to be understood that both the foregoing summary and the following detailed description are of a preferred embodiment and should not be viewed as restrictive. In particular, while this disclosure includes reference to a number of specific embodiments, it will be appreciated that the description is merely illustrative. Various modifications and applications may occur to those who are skilled in the art, without departing from the spirit and the scope of the disclosure, as described by the appended claims. Likewise, other objects, features, benefits and advantages of the present disclosure will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Figure 1:
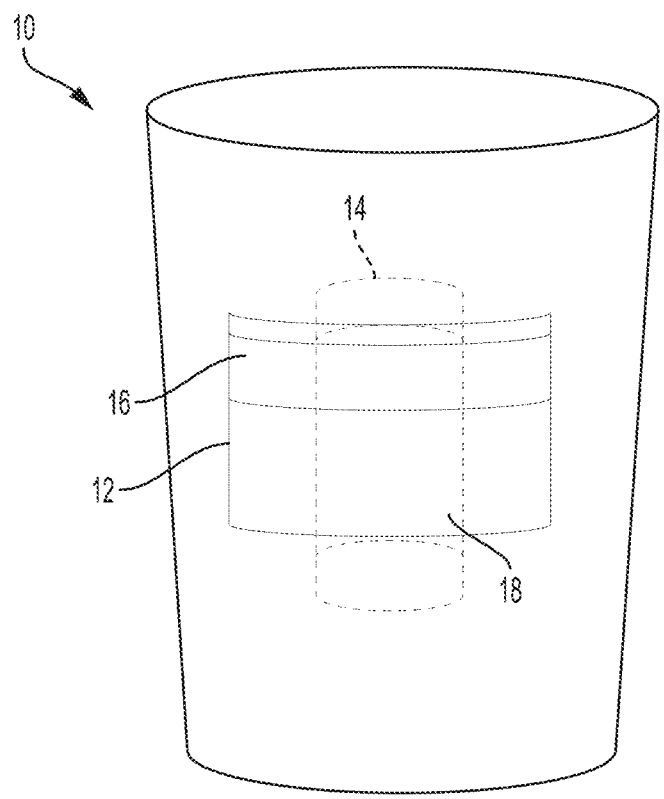
FIG. 1 illustrates a front view of various aspects of embodiments of the present disclosure.

FIG. 1 illustrates a beverage container 10 having a front label 12 and rear label 14. One or more microstructures can be attached or manufactured onto the front and rear labels. The labels can be disposed on opposite side of the container and configured to contact the holders hand on both sides of the container. The microstructures can be placed on the entire label or on part of the label. The front label 12 can include a front microstructured area 16. In one embodiment, the front microstructured area 16 can be a horizontally oriented strip designed to engage the thumb or thenar area of the holder when normally holding the container. As such, front microstructured area 16 may be positioned toward a top side of the front label 12. The rear label can include a rear microstructured area 18. The rear microstructured area 18 may be configured to engage the fingers of the holder when normally holding the container. As such, rear microstructured area 18 may be larger than front microstructure area 16, and/or may extend further or be positioned at or below the height of front microstructured area 16. The front and rear labels can be manufactured with one or more microstructures and then affixed to the containers. In one embodiment, a single label can encircle the container and include the front microstructured area 16 and the rear microstructured area 18. In one embodiment, the labels can be transparent or partially transparent.

In one embodiment, the microstructures themselves can have a height in the range of 25 to 1500 microns with microstructured feature(s) having a width in the range of 50 to 1000 microns. The spacing between features can be in the range of 200 microns to 5000 microns. The microstructured features can include pillars having an overhead 2D shape that is taken from the group consisting of circular, square, oval, triangle, rectangle, or linear ridges, bars, or other geometric shape or combination thereof. The percentage of microstructured area that is covered with microstructured features can be in the range of 0.25 to 25% by way of density. The draft angles of sides of the microstructured features, such as pillars, can be greater than 45 degrees. In some embodiments, the draft angle is greater than 60 degrees. The aspect ratio defined by the height of the microstructured feature to the width of the microstructured feature can be in the range of 0.5 to 5.

The microstructured features width can be 100 microns or less when viewed from an overhead orientation by the naked eye. The microstructured features may thus be not readily viewable or perceivably by the naked eye, such that they are generally invisible or unseen microstructures. These microstructured features can have a width in the range of 20 to 2000 microns when viewed from above. Microstructured features larger than 100 microns can be seen by the naked eye.

The microstructures described herein can include physical properties of being invisible to the naked eye, having a high friction to grip when in contact with the holder's skin (either wet or dry), a low cost of production, and a high grip achieved without a large surface area of microstructures. In some embodiments, the micro-features of the microstructure can be visible and have a high grip property while also having a low covering percentage of the surface of the container. The draft angles can be greater than 60 degrees, and an array of microstructured features can be used instead of a few macro features.

In one embodiment, the label, object, or contact surface can include invisible or visible features by printing transparent polymer (ink jet, thermal transfer, rapid prototyping printing, etc.) after label printing and pictures are printed (paper, plastic, or otherwise) on the label. In some examples, other viable print processes may be used, such as e-beam, cast n cure, flexography, gravure, screen, embossing, and more. In one embodiment, invisible or visible features can be added by embossing the reverse side of shrink wrap or clear plastic labels after the label is printed on the inside surface.

Figure 2:
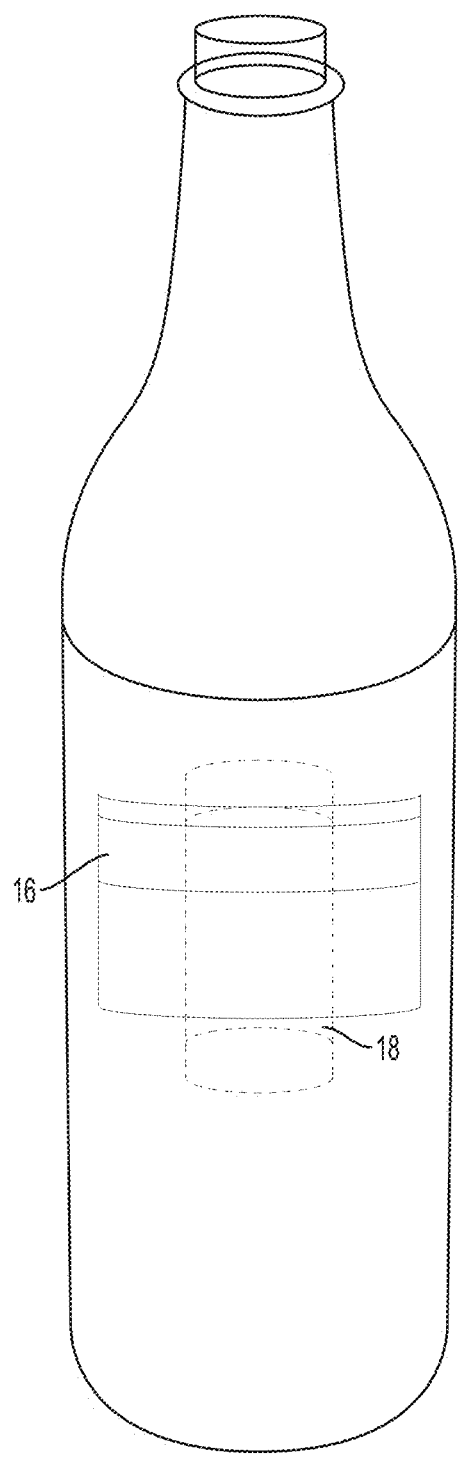
FIG. 2 illustrates another front view of various aspects of embodiments of the present disclosure.

Referring to FIG. 2, the microstructures can be manufactured on the container itself wherein the configuration can resemble the placement of the labels shown in FIG. 1. The container can include a front microstructured area 16 and a rear microstructured area 18. In one embodiment, the microstructure the can include microstructured features with height between 70 μm and 1000 μm. The microstructures with a micro-feature density on the label or container in the range of 0.5% and 25% and can reduce heat transfer from a hot surface (such as an outer wall) to a second surface (such as a hand) that rests against the outer ends of the micro features facing away from the hot surface. The microstructured features can be uniformly distributed or in a random patterned array.

Figure 3:
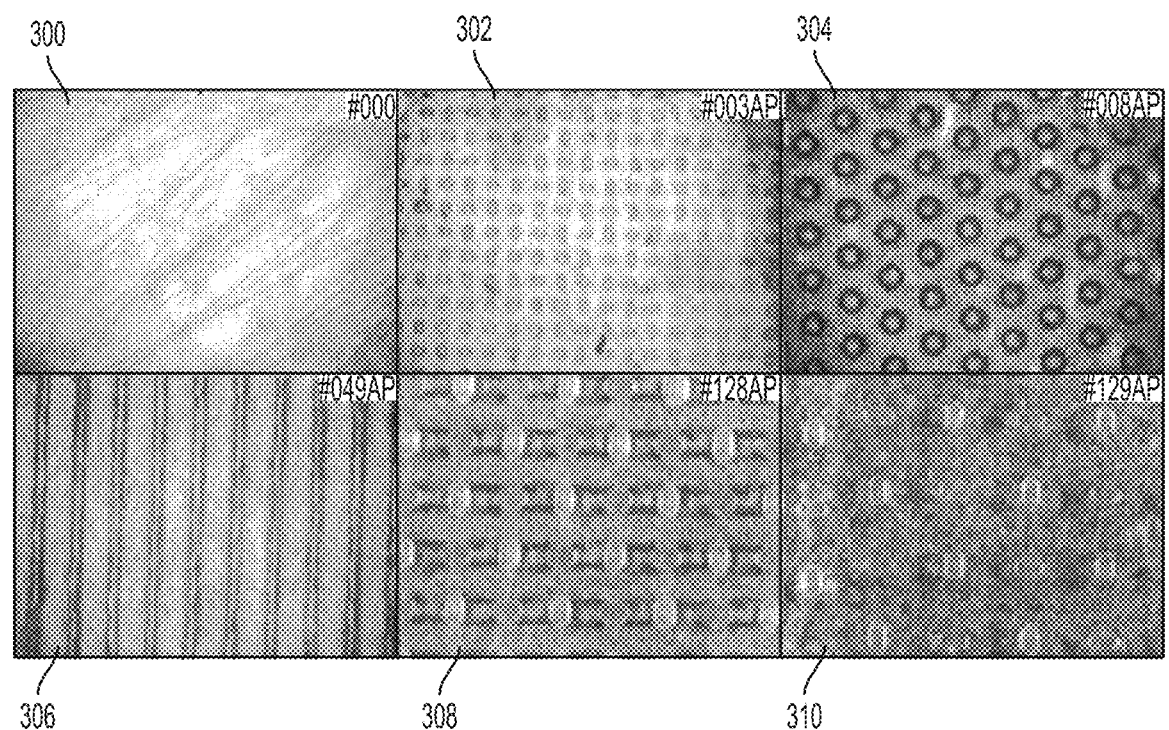
FIG. 3 illustrates several physical aspects of embodiments of the present disclosure.

FIG. 3 illustrates several micro-feature patterns that may be included in embodiments of the present disclosure. The patterns are shown as patterns 300 (no microstructures), 302, 304, 306, 308, and 310. Patterns 302, 308, and 310 generally contain micro-features with cross-sections that are elliptical and can include rounded edges. The various micro-features can be arranged so that the long axis of the micro-features alternate about 180 degree to the adjacent micro-feature or are in an alternating orthogonal pattern. Pattern 304 includes a cross-section that is generally circular and can have generally flat or rounded tips. The micro-features can be arranged in an offset linear fashion so that the vertical rows are offset in relation to the adjacent vertical rows. Pattern 306 includes ridges that run along the substrate surface in generally parallel formation. Pattern 308 generally contains micro-features with cross-sections that are elliptical when viewed from above. The various micro-features can be arranged so that the long axis of the micro-features alternate about 180 degree to the adjacent micro-feature or are in an alternating orthogonal pattern.

Figure 4A:
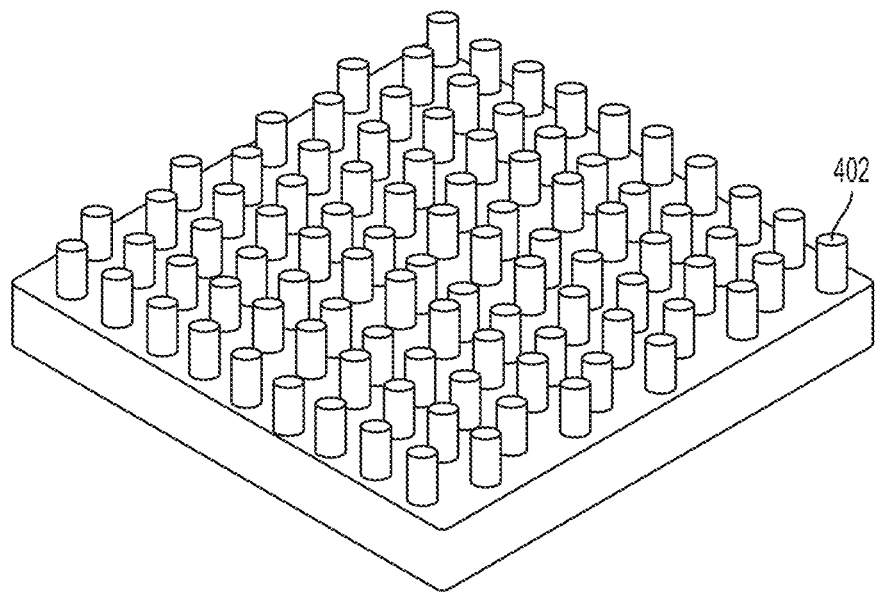
FIGS. 4A and 4B illustrate several physical aspects of embodiments of the present disclosure.
Figure 4B:
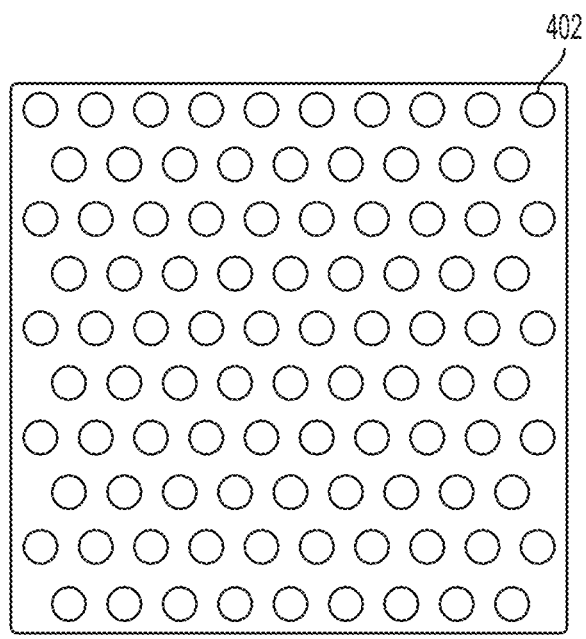

FIGS. 4A and 4B illustrate perspective views showing micro-features that are have a generally round cross-section. The microstructured features 402 can be pillars, columns, or cylinders and arranged in alternation pattern in relation to the row above and below the present row. Further, the features 402 may include a flat top, curved top, pointed top, or any other shape. FIGS. 4A and 4B illustrate features 402 having a flat top.

Figure 5A:
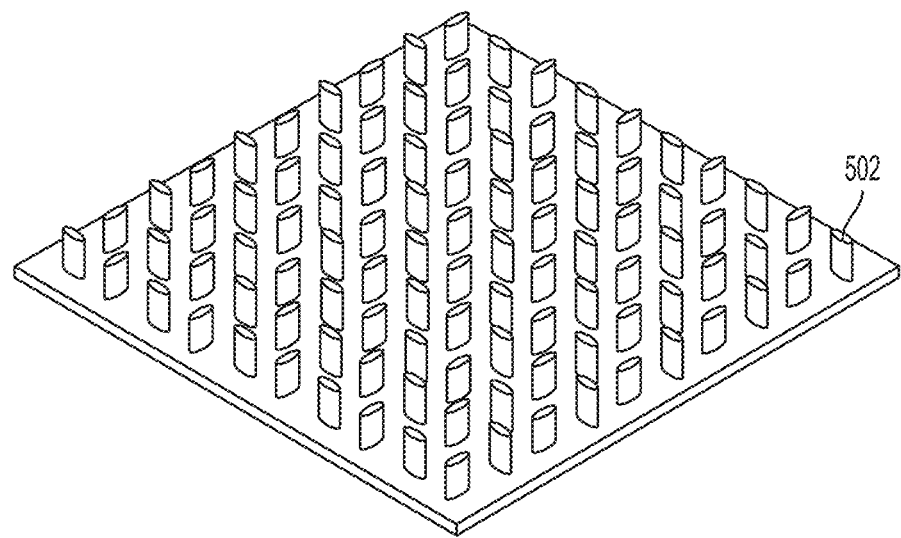
FIGS. 5A and 5B illustrate several physical aspects of embodiments of the present disclosure.
Figure 5B:
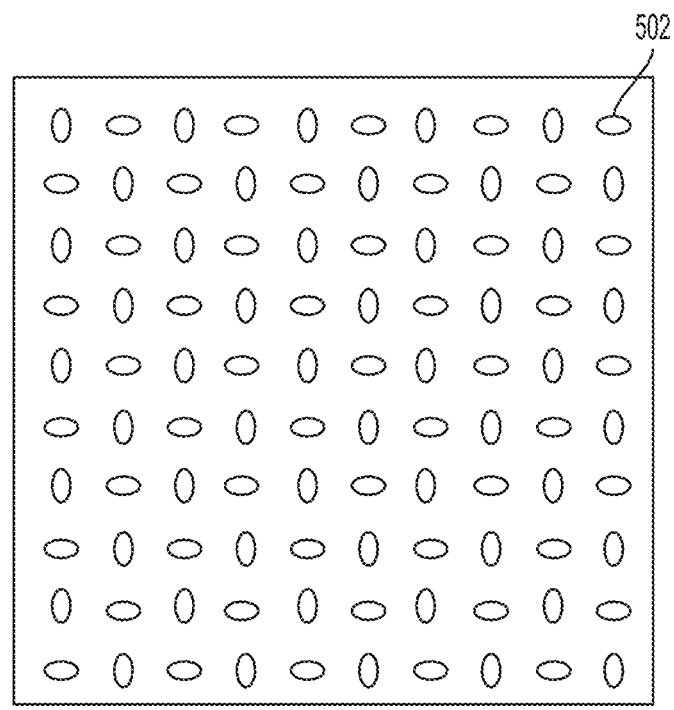

FIGS. 5A and 5B illustrate a generally oval cross section of microstructured features 502. The microstructured features 502 can be arranged so that the long axis of the micro-features alternate about 180 degree with respect to the adjacent micro-feature, or are in an alternating orthogonal pattern. FIG. 5B shows a top down perspective view.

Figure 6:
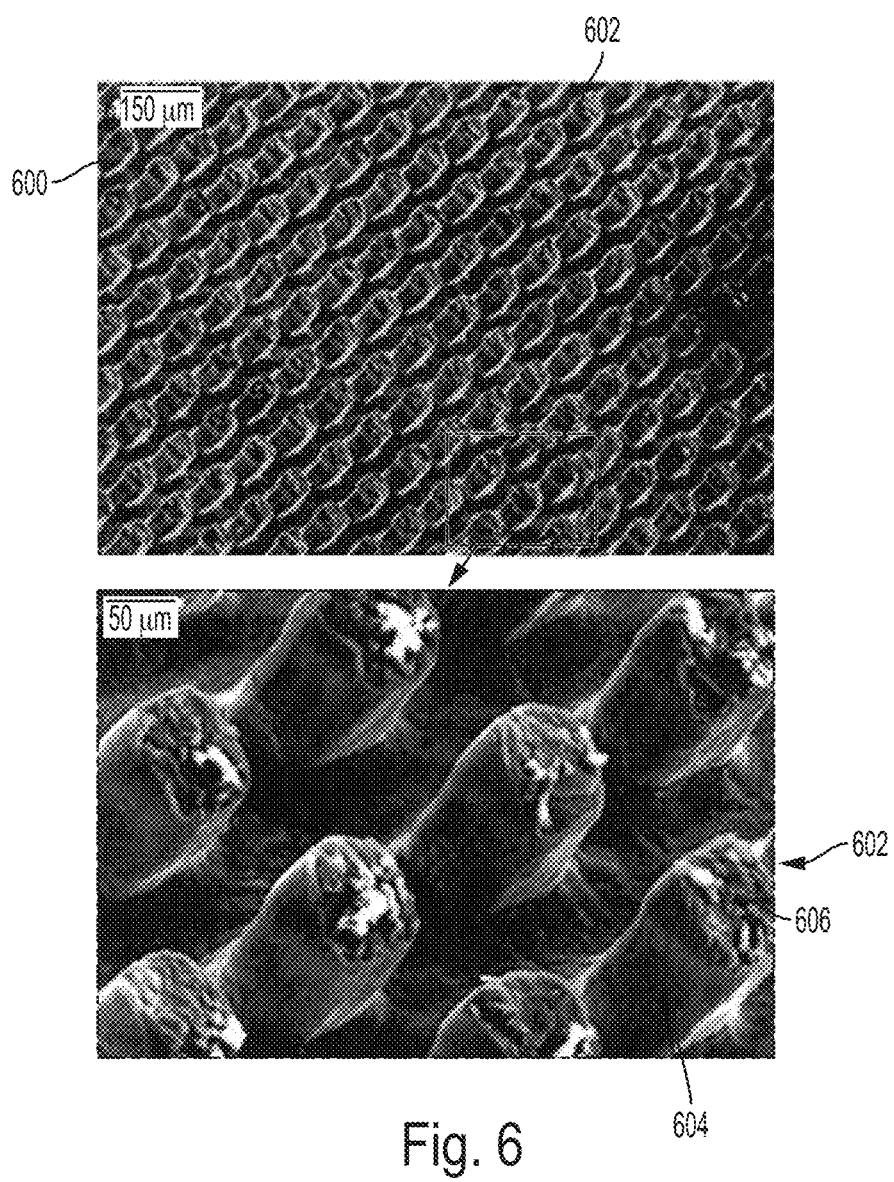
FIG. 6 is a perspective view of aspects of embodiments of the present disclosure.

FIG. 6 illustrates a pattern of an embodiment of the present disclosure in which pillar shaped microstructures 602 are arranged on a label, closure, or container. The microstructure 602 can include a column 604 with a second microstructure 606 of smaller scale on the top of each column 604.

As for the columns 604 themselves, they can have a square cross-section, circular cross section, trapezoid cross section, polygon cross section, asymmetrical cross section, or any other shaped cross section. A rounded, filleted base can be included in each column 604. The microstructures on the contact surface or substrate of the label or container can have a plurality of columns 604 where the columns 604 have an area between 63 cm2/100 cm2 and 242 cm2/100 cm2.

In operation, features of the present disclosure can increase the grip on a container (directly or through its label) whether the container and holder's hand is wet or dry without causing pain or abrasion. The application of the invention can be to objects that are rubber, plastic, metal, paper, or another material, and may include items such as such as bottles, labels, sporting equipment, tools, and other objects held by users.

Figure 7:
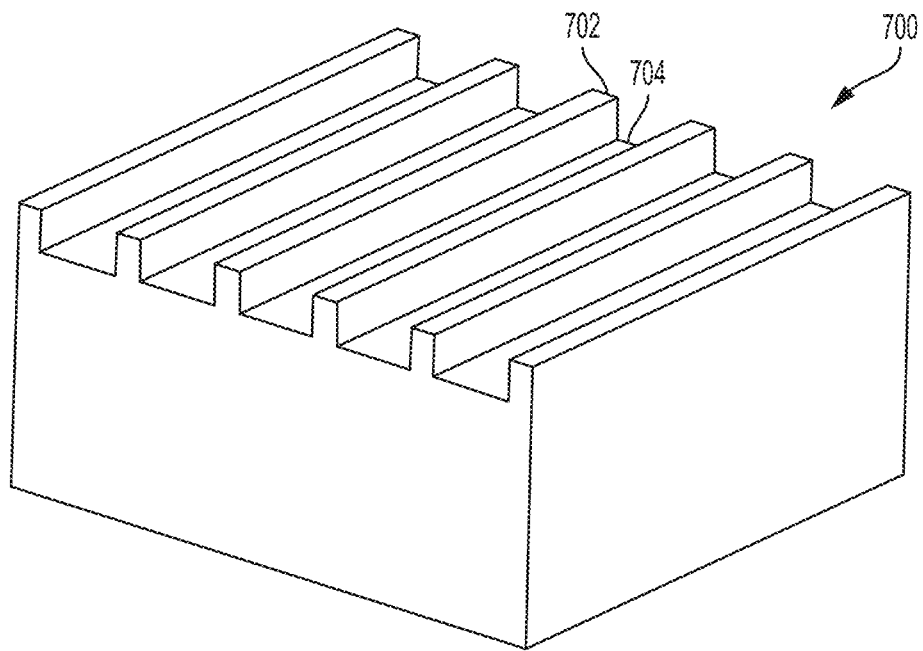
FIG. 7 is a perspective view of aspects of embodiments of the present disclosure.

FIG. 7 illustrates an example pattern 700 having microstructured features that may include a land and groove or peak and trough structure as shown. FIG. 7 shows an example peak 702 and trough 704.

Figure 8:
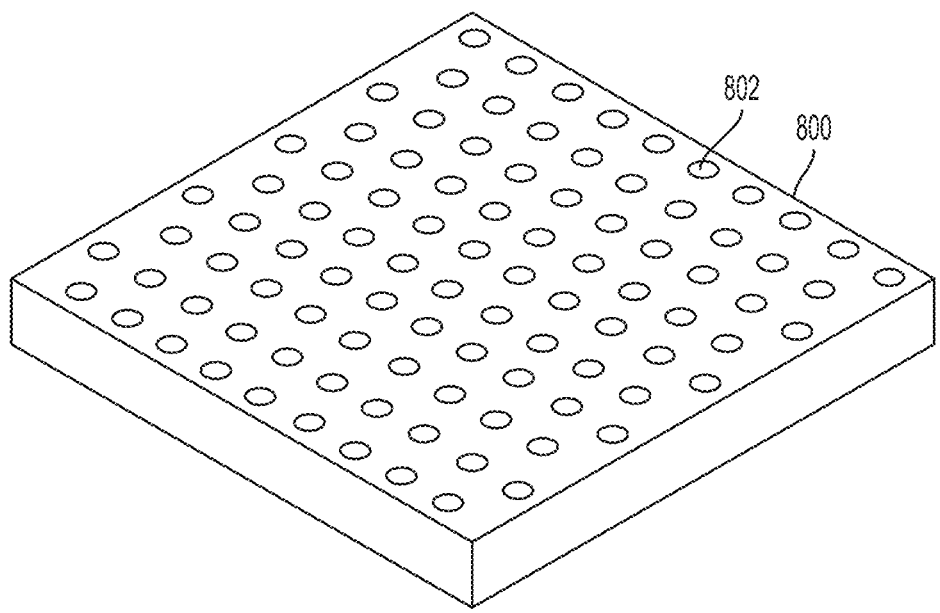
FIG. 8 is a perspective view of aspects of the embodiments of the present disclosure.

FIG. 8 illustrates another example pattern, in which microstructured features 802 are inverted, descending into the substrate 800.

Figure 9A:
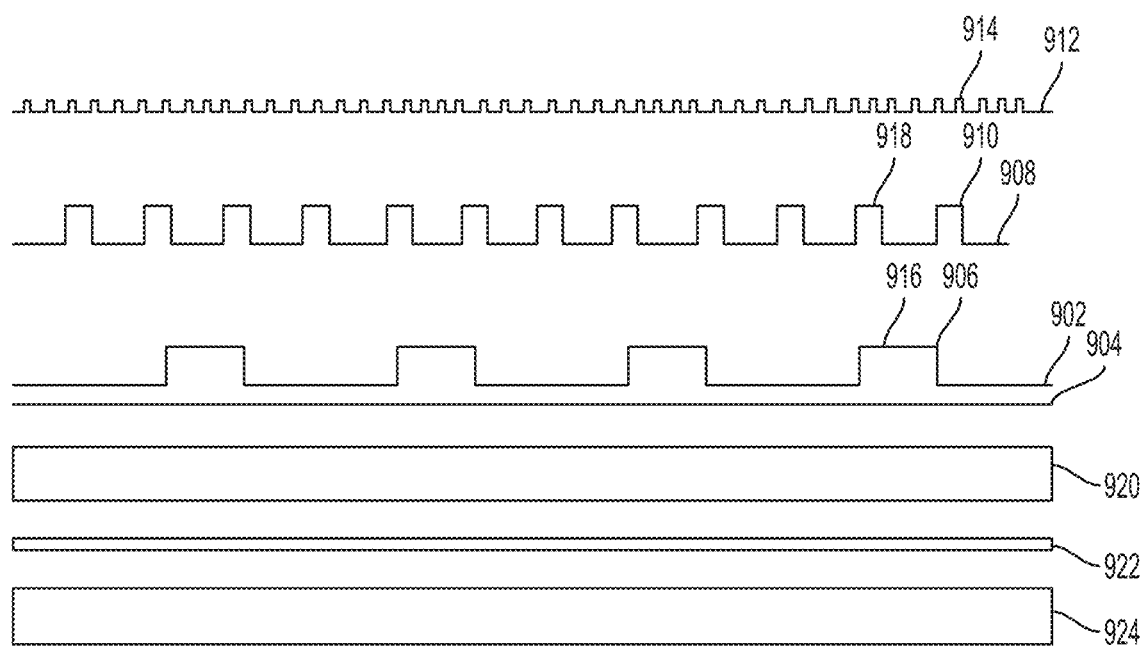
FIG. 9A is a side cross section view of aspects of embodiments of the present disclosure.
Figure 9B:
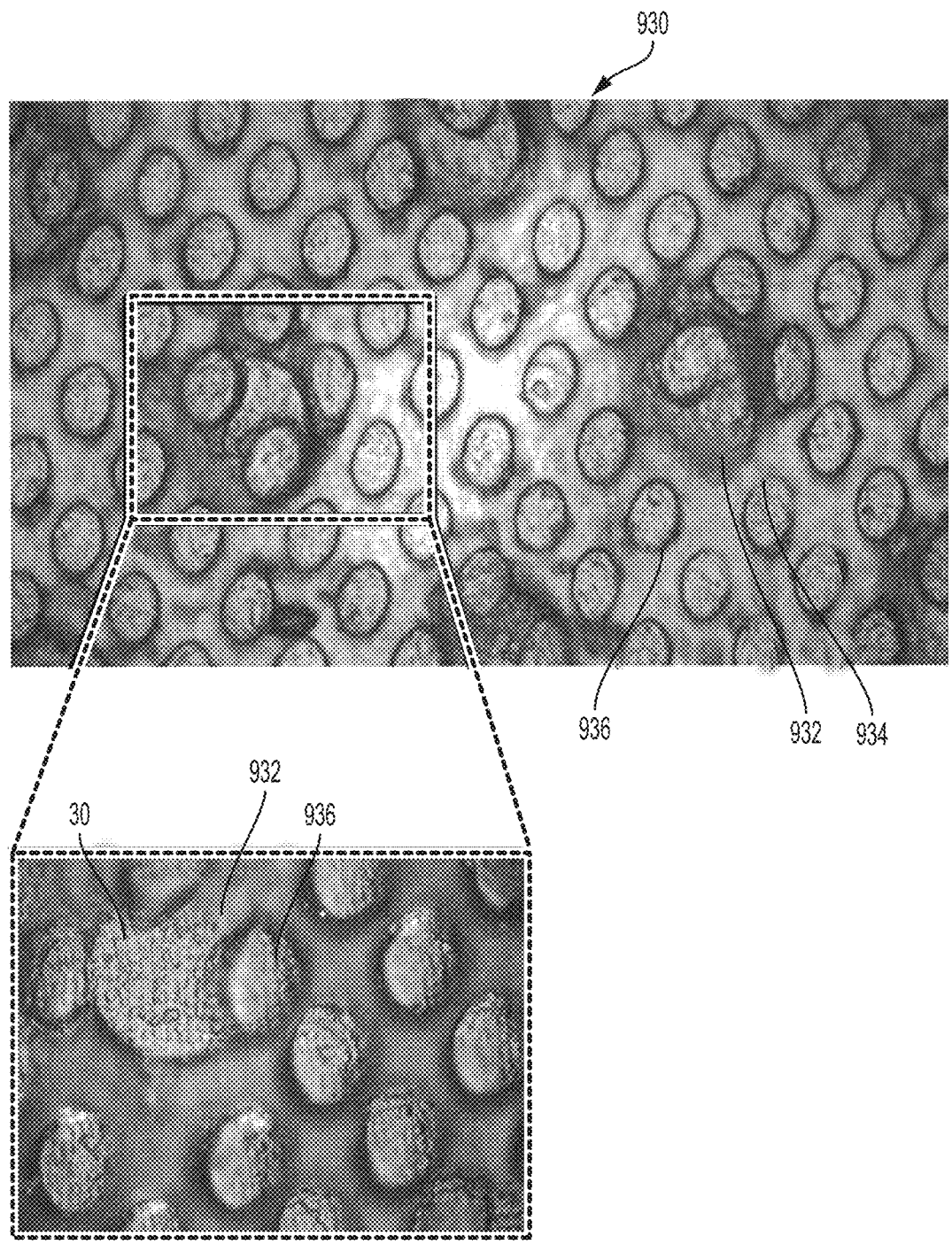
FIG. 9B is a top view of aspects of embodiments of the present disclosure.

FIGS. 9A and 9B illustrate how various microstructures may be layered on one another. In some embodiments, the microstructures can include various layers super imposed on each other. These layers, collectively, can form a composite microstructure. A first layer 902 can be applied to a substrate or surface 904 such as the label or the surface of a container. The first layer 902 can include a first set of first microstructures 906 that can each have a diameter in the range of 80 μm to 120 μm, a pitch of between 260 μm and 300 μm and depth of 30 μm to 50 μm. A second layer 908 can be applied on the first layer 902 and can include a second set of microstructures 910 that can each have a diameter in the range of 10 μm and 50 μm, a pitch of between 40 μm and 80 μm and depth of 30 μm to 50 μm. When the second layer 908 is placed on the first layer 902, the fidelity of the first layer can be maintained at 90% or greater. In one embodiment, the application of the second layer 908 may reduce warping of the individual microstructures 906 of the first layer 902. A third layer 912 having a third set of microstructures 914 can be placed on the first and/or second layer. In some embodiments, the third set of microstructures 914 has a diameter of about 10 μm, a pitch of 20 μm and depth of 20 μm. In some examples, one or more sets of microstructures may have a diameter of about 100 μm, a pitch of about 200 μm and a depth of about 200 μm.

In some embodiments, the second layer 908 and/or third layer 912 may be placed on the surface 904, on the top of the first set of microstructures 906 on horizontal area 916. In some embodiments, the third layer 914 may be placed on the top of the second set of microstructures 908 on horizontal area 918. The application of the third layer 912 can deform the first and/or second layers. When the third layer 912 is placed on the first layer 902, the fidelity of the first layer 902 can maintain 90% or greater fidelity. When the third layer 912 is placed on the second layer 908, the fidelity of the second layer 908 can maintain 90% or greater fidelity.

In one embodiment, the microstructures can be applied to a base layer 920. Each set of microstructures can be attached to a first side of the base layer 920. The other side of the base layer 920 can be affixed to an adhesion layer 922. The adhesion layer 922 can be affixed to the surface 924 of an article. The adhesion layer 922 can be removably affixed to the surface of the article 924. The surface of the article 924 can be a straight outer surface, curved outer surface or other shape.

FIG. 9B illustrates an example microstructure pattern 930 having a first set of microstructures 932 that may include deformed edges such as edge 934 due to the addition of a second or third set of microstructures. The deformation of the first set of microstructures 932 may result in a pattern of peaks disposed along the substrate generally between 260 μm and 300 μm apart. The peaks can include rounded edges forming a general sloped shape down from the apex of each microstructure in the set of microstructures. The second layer of microstructures 936 can be placed on the first layer 932 without the need for alignment of the first and second layers, thereby removing the need for any registration of the two layers. A third layer (not shown) can be placed on the first or second layer without the need for any alignment or registration as well.

Figure 10:
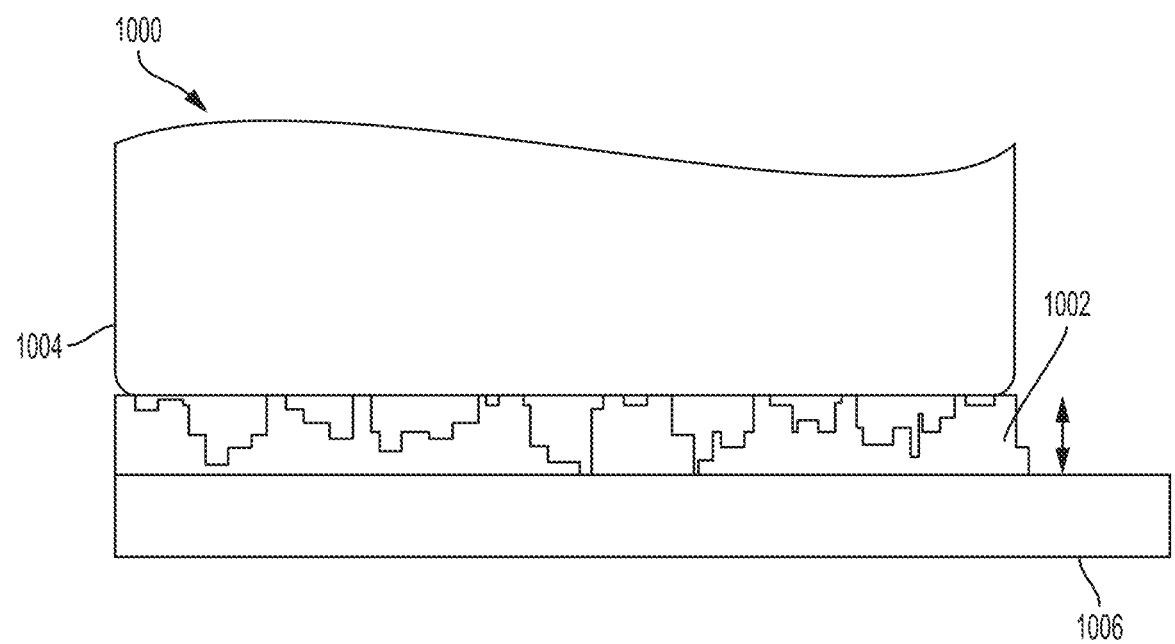
FIG. 10 illustrates a perspective side view of aspects of embodiments of the present disclosure.

FIG. 10 illustrates an example side perspective view of embodiments of the present disclosure. For instance, FIG. 10 shows a composite microstructure 1002 coupled to or affixed to a base layer or substrate 1006. Further, composite microstructure is in contact with the skin of a person 1004. In some examples, the amount of contact may be in the range of 1-7%.

To determine the physical properties of the invention and specifically the friction achieved under varying conditions of the microstructured surface to human skin, lift testing may be performed. For one embodiment, the purpose of the lift testing is to evaluate grip performance of molded polypropylene plaques against human skin in both dry and lubricated conditions. "Grip", as used herein, may be a quantification of resistance to slip in the lateral direction of a surface when in contact with skin. Grip can be uni-directional or bi-directional. The magnitude of resistance to slipping may be proportional to the applied pressure. In some embodiments and lift tests a contact percentage of the composite microstructured surface to the skin may be in the range of 1% to 7%. For a particular microstructure arrangement, including both single layer and multi-layer arrangements of microstructures, the contact percentage may be calculated as the ratio of the area of the upper most top portions of the microstructure or composite microstructure relative to the total area of the upper most portion of the microstructure or composite microstructured surface itself. For example, the top surface of a microstructure may cover 10 μm2 for an area of 100 μm2 such that the contact percentage is 10%.

In one embodiment, the microstructures that contact the skin have a height or relative height in the range of 30 μm to 100 μm. A relative height may be the height of the second set of microstructures above the first set of microstructures, the height of the third micro-structure set above the second or first set, or the height from the top of the outermost micro-structure set to the next highest, third highest, or from the base layer. When the microstructure height exceeds 100 μm, there can be a discomfort to the test subject due to the negative interaction with the nerve ending of the test subject. When the microstructure or composite microstructure height is less than 30 μm, there may not be sufficient contact with the test subject to provide sufficient grip.

When a test subject gripped a container with a microstructure or microstructured label, the force required to grip the container fell within the standard operating range of consumer products such as bottles, cans, or other handheld products that typically contain a label. This is to say that the force applied by the test subject did not abnormally deform the container nor was there abnormal force needed to lift the container. Several 2 inch×2 inch×2 mm samples were manufactured from standard injection grade random co-polymer (RCP) polypropylene. Samples were cut in half and each half glued together such that the microstructure was present on both sides of the sample. A hole was drilled in the end of each sample for later attachment to a tensiometer. For directional patterns, testing in the proper orientation was performed to provide the highest level of grip. Microstructure samples were selected at random and given to test subjects. The test subjects were not provided with any information about the microstructures themselves. The test subject was asked to describe the sample by sight and feel.

Example 1—Dry Testing

The microstructured sample was attached to a tensiometer, 15 lb in one case, and the force readout was faced away from the test subject. The microstructure sample was gripped with approximately the same amount of pressure used when picking up a small container such as a bottle. The sample was lifted and the lift force was recorded.

Example 2—Lubricated Testing

Microstructured samples were dipped in a solution of 65% dish soap (Dawn®) and 35% water and held vertically for 30 seconds to allow excess liquid to run off. The dry test procedure was repeated. Lubricated samples were run consecutively in order to reduce pruning of the tester's fingers.

Table 1 below summarizes the test results under both dry and lubricated conditions for the microstructure samples tested:

TABLE 1

| Microstructure | Dry Lift Force (lbs) | Wet Lift Force (lbs) |
| --- | --- | --- |
| H000 (Smooth Control) | 7 | 0 |
| H003 | 12 | 10 |
| H079 | 7 | 8 |
| H049 | 11 | 13 |
| H120 | 10 | 10 |
| H021 | 10 | 10 |
| H089 | 15 | 10 |
| H088 | 12 | 10 |
| H009 | 10 | 11 |
| H122 | 11 | 11 |
| H034 | 10 | 9 |
| H111 | 11 | 8.5 |
| H160 | 10 | 10 |

The results stated above can have value plus and minus 2 lbs. The test subjects were also asked to analyze the tactile properties of the sample microstructure and evaluate the tactile sensation in terms of comfort such as "smooth and soft" vs. "painful and prickly". Of the above microstructures, four were deemed acceptable for physical grip and tactile performance: H003, H049, H079 and H160.

In one embodiment, the microstructure shown above can have the following representative dimensions shown in TABLE 2.

TABLE 2

| Pattern | INDEX depth variant | SIZE µm | SHAPE | PITCH µm (unless otherwise noted) | LATTICE | DEPTH µm (unless otherwise noted) |
|---|---|---|---|---|---|---|
| H003 | A | 50 × 25 | oval | 100 | rectangular | 70 |
| H079 | A | 300 | circles | 300 | triangular | 150 |
| H049 | A | 50 | lines | 200 | linear | 75 |
| H120 | A | 3 mm | sinusoid | 3 mm | triangular | 1.5 mm |
| H021 | B | 100 | square | 350 | triangular | 150 |
| H089 | A | 750 | circles | 750 | triangular | 500 |
| H088 | A | 600 | circles | 600 | triangular | 400 |
| H009 | A | 100 | circle | 200 | triangular | 200 |
| H122 | A | 500 | circles | 1 mm | triangular | 500 |
| H034 | A | 30 | circle | 85 | rectangular | 40 |
| H111 | A | 500 | circles | 1 mm | triangular | 1 mm |
| H160 | A | 10 + 100 | circle | 20 + 200 | triangular | 20 + 200 |
| H043 | A | 100 | circle | 280 | rectangular | 40 |
| H035 | A | 30 | circle | 60 | rectangular | 40 |
| H053 | A | 6 | circle | 6 | rectangular | 2 |

For microstructure H003, the first dimension under size represents a dimension along the length and the second dimension under size represents a dimension along the width of a micro-feature included in the microstructure. For microstructure H160, the first dimension under size represents a first set of microstructures, the second dimension under size represents a second set of microstructures, the first dimension under pitch represents the pitch of the first set of microstructures and the second dimension under pitch represents the pitch of the second set of microstructures. In one embodiment, the size dimension can be in the range of plus or minus 20% of the respective dimension or any range thereof. Each microstructure in a set of microstructures can be taken from the group consisting of circles, ovals, lines, squares, rectangles, triangles, sinusoid, or any combination thereof. The lattice defined by the placement of individual microstructures on a surface or substrate can be in an arrangement taken from the group consisting of rectangular, triangular, offset or any combination thereof. The pitch dimension can be in the range of plus or minus 20% of the respective dimension or any range thereof. The depth can be in the range of plus or minus 20% of the respective dimension or any range thereof. These microstructure patterns can be single patterns or can be composite patterns including multiple like or unlike set of microstructures on the same substrate or surface. The composite microstructures can include layers that are aligned respective to each other (registered) or are not aligned relative to each other (unregistered).

In one embodiment, the invention can be used to create labels, stickers, wraps and the like that can be added to other articles that are handed by users. For example, tools, sporting equipment and medical device can be included in the additional uses. In many cases, the article needs to be gripped by a user and can be exposed to fluids that can decrease the ability of the user to maintainer a secure grip. Sporting equipment can be exposed to fluids form weather such as rain such (e.g. baseball bats and golf clubs). Tools can be used in wet environment from weather of the working environment itself such as oil and other fluids from vehicles, rain when working with landscaping tools, and water from swimming pools, ponds and the like. The label, sticker or wrap can be affixed to the article and increase the ability of the user to grip the article wet of dry.

Example 3—Additional Testing

Microstructured samples were tested under various conditions, including dry, with water, with Tide, with Downy, with Motor Oil, with Canola Liquid Oil, and with Lotion. Table 3 below summarizes the test results under both dry and lubricated conditions for the microstructure samples tested:

TABLE 3

| Environment Pattern | Dry | Water | Tide | Downy | Motor oil (QT) | Canola liquid oil (Crisco) | Lotion (Aveeno) |
|---|---|---|---|---|---|---|---|
| Blank | 33.3 | 22.5 | 0.6 | 1.2 | 1.2 | 2.1 | 0.4 |
| H003AP | 44.4 | 45.7 | 33.9 | 42.5 | 44.6 | 53.1 | 34.7 |
| H049AP | 40.9 | 37.9 | 17.2 | 26.9 | 35.8 | 39.2 | 23.6 |
| H079AP | 54.4 | 52.3 | 25.5 | 45.3 | 53.3 | 54.4 | 37.5 |

Figure 11:
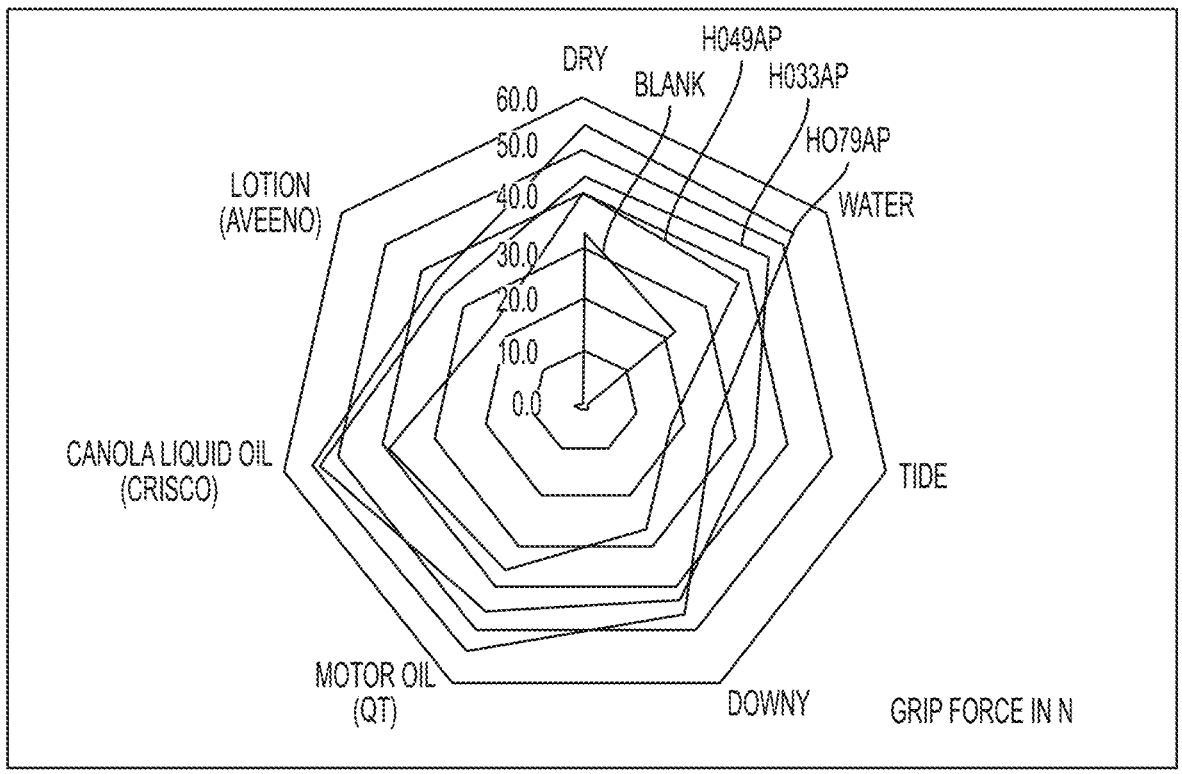
FIG. 11 illustrates a chart of experimental results when patterns were tested under various conditions.

The grip force in Newtons is shown for each pattern. As can be seen from the results, the patterned structures performed better than the "blank" sample, enabling a user to have an increased grip. FIG. 11 shows a chart illustrating the performance of each pattern.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A contact surface for an object comprising:
   a flat base layer having a microstructured area; and
   a composite microstructure disposed on the microstructured area comprising:
      a first set of microstructures having a first micro-feature with a first width between 80 µm and 120 µm, the first set of microstructures disposed on the flat base layer; and
      a second set of microstructures having a second micro-feature with a second width less than the first width, the second set of microstructures having a first portion disposed on the flat base layer and a second portion disposed on the first set of microstructures,
   wherein the composite microstructures includes a contact percentage of the composite microstructure to skin of a hand in contact with the contact surface in the range of 1% to 25%.

2. The contact surface of claim 1 further comprising an adhesive layer affixed to the flat base layer configured to affix the base layer to the object.

3. The contact surface of claim 1, wherein the second width is between 25% and 41% of the first width.

4. The contact surface of claim 2, the composite microstructure further comprising a third set of microstructures having a third micro feature with a third width between 3% and 6% of the first width.

5. The contact surface of claim 1 wherein the first micro-feature includes deformed edges such that the first set of microstructures provides peaks and valleys on the base layer.

6. The contact surface of claim 1 wherein the composite microstructure has a height in the range of 30 µm to 100 µm.

7. The contact surface of claim 1 wherein the contact percentage is in the range of 1% to 7%.

8. The contact surface of claim 1 wherein the first micro-feature has a cross section taken from the group consisting of circular, square, oval, triangle, rectangle, bar or any combination thereof.

9. The contact surface of claim 2 wherein the composite microstructure, base layer, and adhesive layer are semi-transparent.

10. The contact surface of claim 1 wherein the first set of microstructures has a first pitch in the range of 260 µm to 300 µm.

11. The contact surface of claim 10 wherein the second set of microstructures has a second pitch less than 24% of the first pitch.

12. The contact surface of claim 10, the composite microstructure further comprising a third set of microstructures having a third pitch less than 15% of the first pitch.

13. The contact surface of claim 1 wherein the first set of microstructures and the second set of microstructure are unregistered.

14. A contact surface for an object comprising:
   a base layer having a microstructured area;
   a composite microstructure disposed on the microstructured area comprising:
      a first set of microstructures disposed on the base layer;
      a second set of microstructures having a first portion disposed on the base layer and a second portion disposed on the first set of microstructures; and
      a third set of microstructures having a first portion disposed on the base layer, a second portion disposed on the first set of microstructures, and a third portion disposed on the second set of microstructures; and
   an adhesive layer affixed to the base layer configured to affix the base layer to the object.

15. The contact surface of claim 14 wherein the second set of microstructures has a second micro-feature having a width between 25% and 41% smaller than a first micro-feature of the first set of microstructures.

16. The contact surface of claim 14 wherein the second set of microstructures has a second micro-feature with deformed edges such that the composite microstructure forms peaks and valleys on the base layer.

17. The contact surface of claim 14 wherein the first set of microstructures, the second set of microstructures, and the third set of microstructures are unregistered.

18. A contact surface for an object comprising:
   a set of microstructures, disposed on a surface, comprising:
      a first micro-feature having a width in the range of 15 µm to 3000 µm, a depth in the range of 30 µm and 1500 µm and pitch in the range of 100 µm and 3000 µm; and
      a second micro-feature having a width between 25% and 41% smaller than the first micro-feature width;
   wherein a contact percentage attributable to the set of microstructures between the set of microstructures and skin of a person gripping the surface is in the range of 1% to 25%.

19. The contact surface of claim 18 wherein the surface is an outer surface of a container.

20. The contact surface of claim 18 wherein the set of microstructures has a depth in the range of 30 µm and 100 µm and a contact percentage attributable to the set of microstructures between the set of microstructures and skin of the person gripping the surface is in the range of 1% to 7%.

21. The contact surface of claim 18 wherein the set of micro structures further comprises a third micro-feature having a width less than the second micro-feature width.

22. A contact surface for an object comprising:
   a base layer having a microstructured area;
   a composite microstructure disposed on the microstructured area comprising a first set of microstructures having a first micro-feature, wherein the composite microstructure has a depth of between 30 µm and 250 µm and wherein a contact percentage attributable to the composite microstructure between the first set of microstructures and skin of a person gripping the surface is in the range of 1% to 25%; and
   an adhesive layer affixed to the base layer configured to affix the base layer to the object,
   wherein the composite microstructure increases a grip force compared to a contact surface without a composite microstructure thereon.

* * * * *